United States Patent [19]
Fujimoto et al.

[11] Patent Number: 5,564,799
[45] Date of Patent: Oct. 15, 1996

[54] HOLDING APPARATUS FOR A SOLENOID VALVE CONTROLLING BRAKE PRESSURE

[75] Inventors: Tsuyoshi Fujimoto; Teruhisa Kohno; Keiichi Ohnishi, all of Itami, Japan

[73] Assignee: Sumitomo Electric Industries, Ltd., Osaka, Japan

[21] Appl. No.: 333,994

[22] Filed: Nov. 2, 1994

Related U.S. Application Data

[63] Continuation of Ser. No. 8,608, Jan. 25, 1993, abandoned.

[30] Foreign Application Priority Data

Jan. 31, 1992 [JP] Japan .................................. 4-016447

[51] Int. Cl.⁶ .................................................. B607 13/68
[52] U.S. Cl. ............................... 303/119.2; 137/596.17
[58] Field of Search ........................... 303/119.2, 115.2; 137/596.17; 251/129.15–129.22

[56] References Cited

U.S. PATENT DOCUMENTS

| | | | |
|---|---|---|---|
| 4,619,289 | 10/1986 | Tsuru et al. | 303/119.2 |
| 4,915,459 | 4/1990 | Hashida et al. | 303/119.2 |
| 5,022,717 | 6/1991 | Heibel et al. | 303/119.2 |
| 5,242,216 | 9/1993 | Miyawaki et al. | |
| 5,248,191 | 9/1993 | Kondo et al. | 303/119.2 |

FOREIGN PATENT DOCUMENTS

| | | |
|---|---|---|
| 2346790 | 3/1974 | Germany . |
| 3237290 | 4/1983 | Germany . |
| 3243642 | 4/1984 | Germany . |
| 3413759 | 10/1985 | Germany . |
| 3705333 | 8/1987 | Germany . |
| 3808625 | 10/1988 | Germany . |
| 3935946 | 5/1990 | Germany . |
| 4003606 | 12/1990 | Germany ............ 303/119.2 |

*Primary Examiner*—Matthew C. Graham
*Attorney, Agent, or Firm*—Greenblum & Bernstein P.L.C.

[57] ABSTRACT

An apparatus, for controlling the pressure of braking-fluid, provided in a circuit for controlling the pressure thereof comprising: a solenoid valve, having a pressure receiving portion fluid-tightly inserted into a housing and an electromagnetic coil, for controlling the pressure of the braking fluid by opening and closing a valve ball communicating with the pressure receiving portion; and holding portion for holding the solenoid valve on the housing against fluid pressure acting on the pressure receiving portion. In this construction, the holding portion is made of a magnetic material and constitutes a part of the electromagnetic path of the solenoid valve.

9 Claims, 4 Drawing Sheets

HOLDING APPARATUS FOR A SOLENOID VALVE CONTROLLING BRAKE PRESSURE

This application is a continuation of application Ser. No. 08/008,608, filed Jan. 25, 1993, now abandoned.

BACKGROUND OF THE INVENTION

1. Field of the Invention

The present invention relates to an apparatus for controlling the pressure of braking fluid and more particularly to the apparatus preferably used to control the pressure of the braking fluid such as in an anti-lock control or a traction control. The present invention relates in particular to a construction for installing a solenoid valve, to be used to reduce, maintain or pressurize the braking fluid, on a housing so as to make the apparatus compact and reduce manufacturing cost.

2. Description of Background Information

An example of a conventional apparatus for controlling the pressure of the braking fluid is described below with reference to FIG. 6.

The apparatus for controlling the pressure of the braking fluid is installed in a circuit for controlling the pressure of the braking fluid. A pressure receiving portion 4a of a frame 4 of a solenoid valve 3 is fluid-tightly inserted into a mounting opening 2 formed in a housing 1.

In the frame 4, a cylindrical portion 4b is formed in continuation with the pressure receiving portion 4a, and a valve chest 5 and a hollow portion 6 are formed inside the cylindrical portion 4b. There are provided, on the pressure receiving portion 4a of the frame 4, a fluid flowing path 8 connecting the valve chest 5 with a pressurizing duct 7 with each other and a discharge path 10 connecting the valve chest 5 with a discharge duct 9 with each other.

As shown in detail in FIG. 6, an armature 12 is axially slidably mounted in the hollow portion 6, and a fixed valve seat 14 mounted on the fluid flowing path 8 is opened and closed by a movable valve ball 13 fixed to the armature 12. The frame 4 incorporates a stator 16 in opposition to the armature 12, and a cylindrical electromagnetic coil 17 is installed on the periphery of the stator 16.

A plate-shaped holding member 18 is disposed on the stator of the solenoid valve 3. The solenoid valve 3 is pressed against the housing 1 by the holding member 18 and thus the solenoid valve 3 is held by the housing 1 against hydraulic pressure acting on the pressure receiving portion 4a.

That is, a plurality of inserting openings 18a are provided through the holding member 18, and screw openings 1a are formed in the housing in correspondence with the inserting openings 18a so that a bolt 20 inserted through the inserting opening 18a and a sleeve 19 is screwed into the screw opening 1a. In this manner, the holding member 18 presses the solenoid valve 3 strongly against the housing 1, thus holding the solenoid valve 3.

In the solenoid valve 3, when the electromagnetic coil 17 is energized, as shown by a two-dot chain line of FIG. 6, there is formed a magnetic circuit constituting a magnetic path in the order of the cylindrical portion 16a of the stator 16, the armature 12, the cylindrical portion 4b of the frame 4, and the flanged portion 16b of the stator 16. The magnetic force generated by the magnetic circuit moves the armature 12 toward the valve-open side against the urging force of a spring 18.

In the conventional apparatus as shown in FIG. 6, however, it is necessary to provide the holding member 18 so as to mount the solenoid valve 3 in the housing 1. As a result, the dimension of the solenoid valve 3 becomes larger in its axial direction by the thickness of the holding member 18 as shown by an arrow (A). Thus, the apparatus becomes larger by the dimension.

Another example of an apparatus for controlling the pressure of braking fluid is described below with reference to FIG. 7. In this apparatus, a male screw 4c is formed in the periphery of the pressure receiving portion 4a of the frame 4, and a female screw 2c is formed on the mounting opening 2 in correspondence with the male screw 4c. The solenoid valve 3 is fixed to the housing 1 by the engagement between the male screw 4c and the female screw 2a. In this construction, the dimension of the solenoid valve 3 can be reduced in its axial direction because it is unnecessary to provide the holding member unlike the conventional apparatus as shown in FIGS. 6 and 8.

In the above-described construction, however, the apparatus becomes large in the direction in which the solenoid valves 3 are arranged because it is necessary to provide a certain interval between adjacent solenoid valves 3 in consideration of mechanical strength thereof.

That is, it is necessary to make the interval (thickness (B) of screw thread cutting portion) between the male screws 4c of the adjacent solenoid valves 3 five times as large as the height of the male screw 4c in order to secure strength.

In the conventional apparatus as shown in FIG. 7, there is a possibility that foreign matter discharged from the male screw 4c penetrates into the valve chest 5 in assembling the apparatus although the valve chest 5 has a construction for preventing the foreign matter from penetrating thereinto. The penetration of the foreign matter into the valve chest 5 causes a big problem. Accordingly, it is difficult to adopt the construction as shown in FIG. 7.

The conventional apparatuses as shown in FIGS. 6 and 7 have problems in manufacturing cost.

That is, it is necessary to provide the fluid flowing path 8 and the discharge path 10 in the frame 4. To this end, it is necessary to machine them from a solid material. But a large quantity of material is cut off and bored to form the valve chest 5 and the hollow portion 6 in the cylindrical portion 4b. Therefore, the apparatus is manufactured at a high cost.

SUMMARY OF THE INVENTION

It is an object of the present invention to provide an apparatus, for controlling the pressure of braking fluid, which is compact and can be manufactured at a low cost by improving a construction for mounting a solenoid valve on a housing.

In accomplishing these and other objects of the present invention, there is provided an apparatus, for controlling the pressure of braking-fluid, provided in a circuit for controlling the pressure thereof comprising: a solenoid valve, having a pressure receiving portion fluid-tightly inserted into a housing and an electromagnetic coil, for controlling the pressure of the braking fluid by opening and closing a valve ball communicating with the pressure receiving portion; and holding means for holding the solenoid valve on the housing against fluid pressure acting on the pressure receiving portion. In this construction, the holding means is made of a magnetic material and constitutes a part of the electromagnetic path of the solenoid valve.

Preferably, the holding means constitutes a magnetic path in the periphery of the electromagnetic coil.

Preferably, the electromagnetic coil is cylindrical; and the holding means generates a magnetic path of an end surface opposite to the pressure receiving portion of the electromagnetic coil.

Preferably, the electromagnetic coil is cylindrical; and the holding means generates a magnetic path in the periphery of the electromagnetic coil and a magnetic path of the end surface opposite to the pressure receiving portion thereof.

According to the construction of the apparatus for controlling the pressure of braking-fluid, the holding portion constitutes the magnetic path of the electromagnetic coil unlike the conventional apparatus in which the magnetic path of the electromagnetic coil is by the frame of the solenoid valve. Therefore, a compact apparatus can be manufactured at a low cost.

That is, in magnetic circuits generated by the cylindrical electromagnetic coil, when a magnetic path of an end surface opposite to the pressure receiving portion of the solenoid valve is composed by the holding member, a flanged portion is not required to be formed on a stator of the solenoid valve unlike the conventional art. Thus, the interval between the housing and the holding member, namely, the dimension of the solenoid valve in its axial direction can be reduced by the thickness of the flanged portion.

In magnetic circuits generated by the cylindrical electromagnetic coil, when a magnetic path in the periphery of the electromagnetic coil is composed of the holding member, unlike the conventional apparatus, it is necessary to construct only the pressure receiving side inside the frame of the solenoid valve. Consequently, a smaller amount of material is consumed to manufacture the frame. In machining the frame from a material, a small amount of material is cut off. That is, the frame can be manufactured at a low cost.

BRIEF DESCRIPTION OF THE DRAWINGS

These and other objects and features of the present invention will become clear from the following description taken in conjunction with the preferred embodiments thereof with reference to the accompanying drawings, in which.

DETAILED DESCRIPTION OF THE PREFERRED EMBODIMENTS

Figure 1:
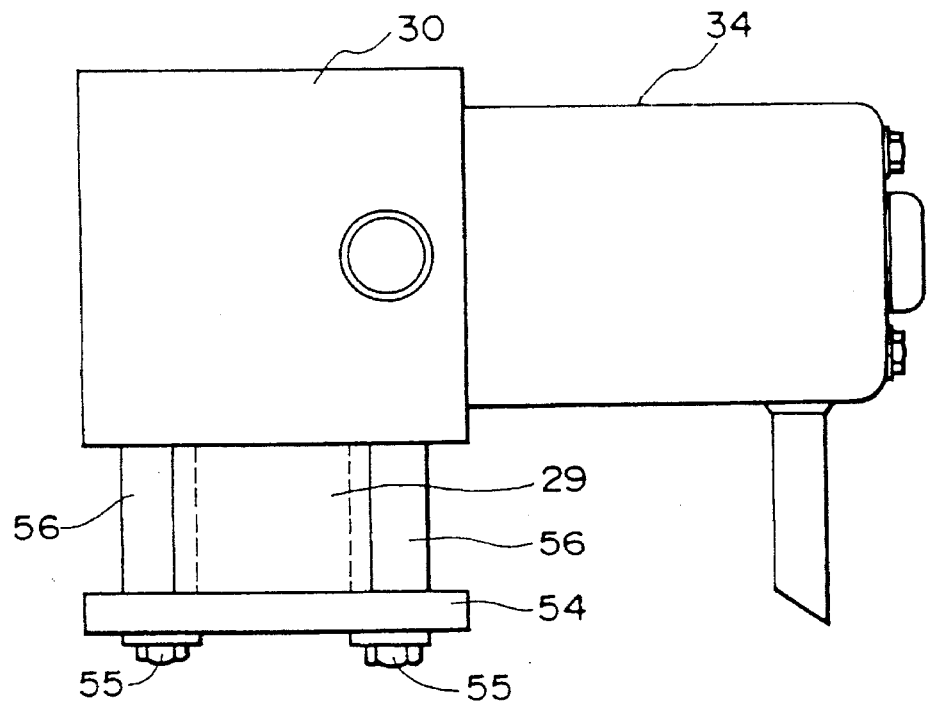
FIG. 1 is a schematic front view showing an apparatus for controlling the pressure of braking fluid according to a first embodiment of the present invention.

Before the description of the present invention proceeds, it is to be noted that like parts are designated by like reference numerals throughout the accompanying drawings.

An apparatus for controlling the pressure of braking fluid according to a first embodiment of the present invention is described below with reference to FIGS. 1 through 3. The apparatus is used for anti-lock control.

In the apparatus, a solenoid valve 29 disposed on a pressurizing line 27 connecting a master cylinder 25 and a wheel cylinder 26 with each other and another solenoid valve 29 disposed on a circulating current line 28 are held by a housing 30.

Figure 2:
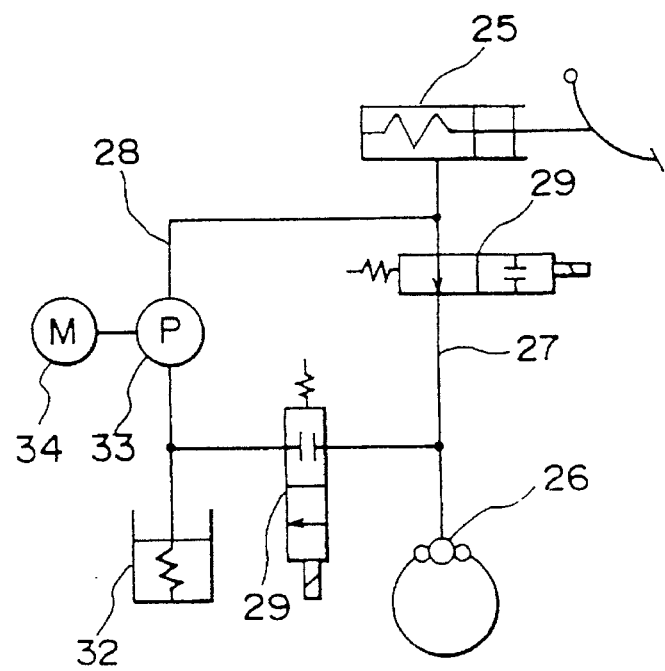
FIG. 2 is a schematic view showing a piping according to the first embodiment of the present invention.

The housing 30 accommodates a reservoir 32 and a pump 33 as shown in FIG. 2, and a motor 34 is installed on the housing 30.

Inside the frame 35 of the solenoid valve 29, a cylindrical portion 35b is axially provided in continuation with a pressure receiving portion 35a.

As will be described later, the pressure receiving portion 35a is fluid-tightly inserted into a mounting opening 31 of the housing 30. A fluid flowing path 37 communicating with a pressurizing duct 36 and a discharge path 39 communicating with the discharge duct 38 are formed in the pressure receiving portion 35a.

A valve chest 41 and a hollow portion 42 communicating with the fluid flowing path 37 and the discharge duct 38 are formed inside the cylindrical portion 35b.

In the hollow portion 42, an armature 43 is axially slidably mounted, and a movable valve ball 44 fixed to the armature 43 opens and closes a fixed valve seat 45 mounted on the fluid flowing path 37.

A stator 47 is provided on an end of the hollow portion 42 in opposition to the armature 43, and a spring 48 is interposed between the armature 43 and the stator 47. When no electric current is supplied, the spring 48 urges the armature 43. Thus, the fixed valve seat 45 is closed by the movable valve ball 44.

A cylindrical electromagnetic coil 49 is disposed in the periphery of the armature 43 so as to energize the electromagnetic coil 49. As a result, the armature 43 is moved against the urging force of the spring 48. In this manner, the fixed valve seat 45 is opened.

A guide ring 50 is provided in the periphery of the armature 43 with the periphery of the guide ring 50 fixed to the inner-diameter side of the frame 35 and the inner periphery thereof fixed to the outer diameter portion disposed at an end of the stator 47 so as to slidably guide the armature 43.

A smaller-diameter first portion 31a and a larger-diameter second portion 31b are continuously formed in the housing 30 in conformity with the outer configuration of the pressure receiving portion 35a.

Annular grooves 51a and 51b are formed in the periphery of the pressure receiving portion 35a, and an O-ring 52 is accommodated in the annular grooves 51a and 51b, respectively.

The pressure receiving portion 35a inserted into the mounting opening 31 secures a fluid-tight state owing to the O-rings 52.

In the first embodiment, the solenoid valve 29 inserted fluid-tightly into the mounting opening 31 of the housing 30 is retained by a holding member 54 disposed on the other side, namely, the stator 47 side as described above.

In the first embodiment, the stator 47 is approximately cylindrical and does not have a flanged portion formed thereon unlike the conventional apparatus which has the flanged portion 16b formed on the stator 16 as described previously with reference to FIGS. 6 and 7. An end surface 47a of the stator 47 opposite to the housing 30 is flush with the lower end surface of the cylindrical portion 35b.

The holding member 54 is made of iron and contacts an end surface of the solenoid valve 29, namely, the end surface of the frame 35 on the cylindrical portion side and the lower end surface 47a of the stator 47. A plurality of inserting openings 54a is formed through the holding member 54, and screw openings 30a are formed through the housing 30 in correspondence with the inserting openings 54a.

A bolt 55 is inserted into the inserting opening 54a, and a screwed portion 55a formed on the upper end of the bolt 55 is screwed into the screw opening 30a. The solenoid valve 29 is fixed to the housing 30 against fluid pressure acting on the pressure receiving portion 35a with the solenoid valve 29 sandwiched between the housing 30 and the holding member 54.

A sleeve 56 is interposed between the holding member 54 and the housing 30 so as to prevent the solenoid valve 29 from being damaged due to a strong tightening of the bolt 55.

Figure 3:
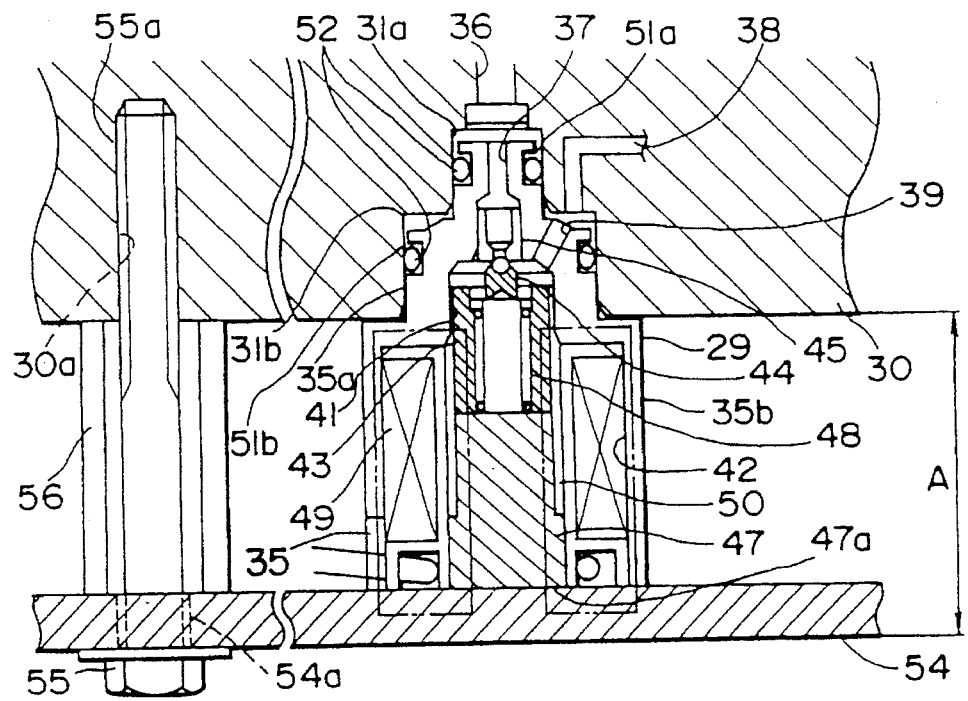
FIG. 3 is a sectional view showing principal portions of the apparatus according to the first embodiment of the present invention.

In the apparatus according to the first embodiment, upon energizing of the electromagnetic coil 49, there is generated a magnetic circuit constituting a magnetic path in the order of the armature 43, the cylindrical portion 35b of the frame 35, the holding member 54, and the stator 47 as shown by two-dot chain lines of FIG. 3.

Figure 6:
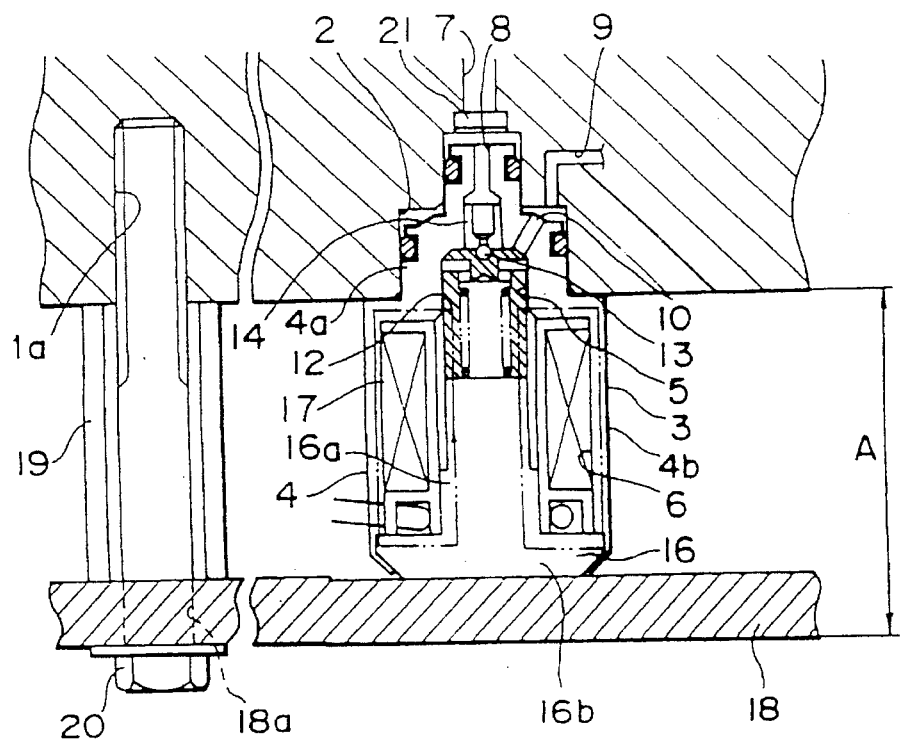
FIG. 6 is a sectional view showing principal portions of an example of a conventional apparatus for controlling the pressure of braking fluid.
Figure 7:
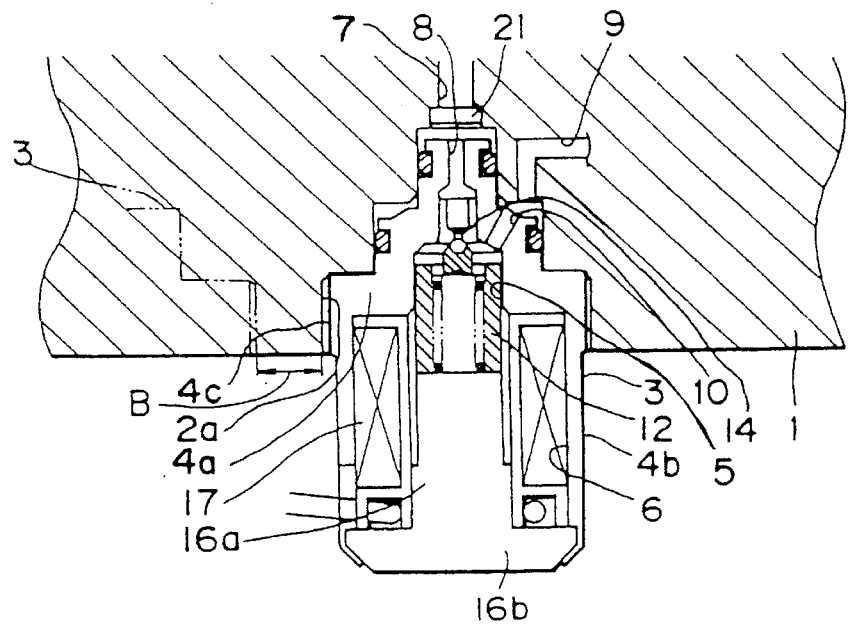
FIG. 7 is a sectional view showing principal portions of another example of a conventional apparatus for controlling the pressure of braking fluid.
Figure 8:
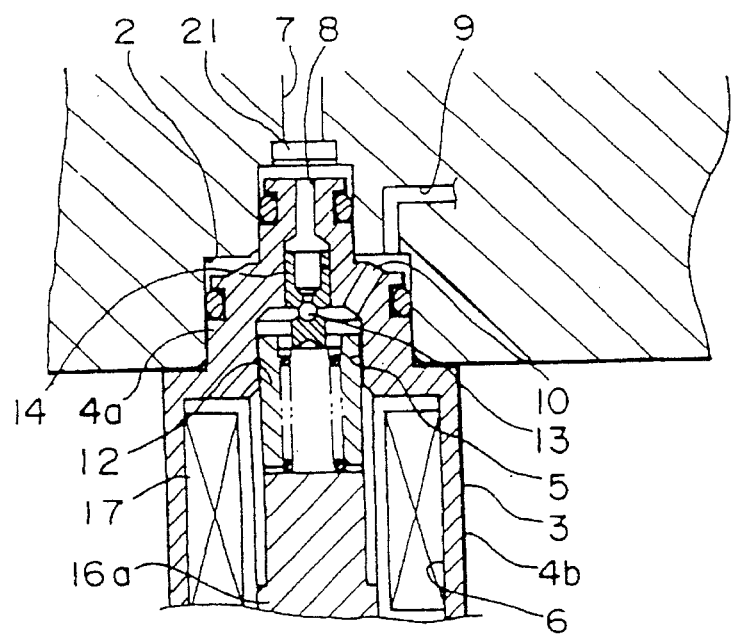
FIG. 8 is an enlarged view showing principal portions of the apparatus of FIG. 6.

In the first embodiment, the holding member 54 constitutes a magnetic path on an end surface opposite to the housing 30, namely, the end surface opposite to the pressure receiving portion 35a of the frame 35 in the magnetic circuit of the electromagnetic coil 49. Therefore, the apparatus eliminates the need for the formation of a flanged portion on the stator 47 unlike the conventional apparatus having flanged portion 16b on the stator 16 as shown in FIGS. 6 and 7. Thus, according to the first embodiment, the dimension A of the solenoid valve 29 in its axial direction can be shortened by the thickness of the flanged portion 16b. In this manner, the apparatus can be made to be compact.

Figure 4:
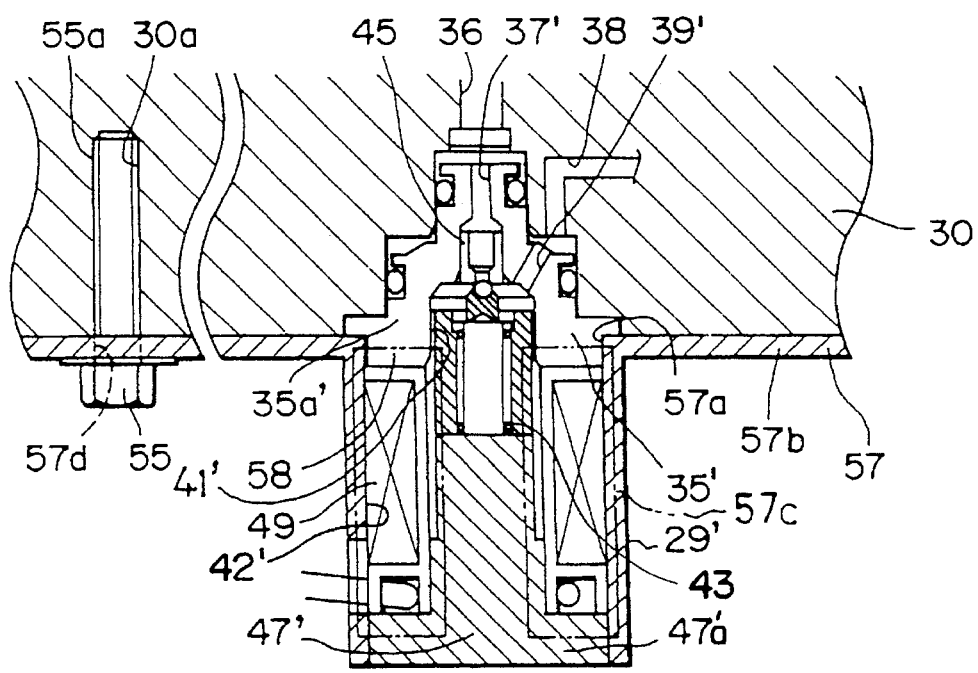
FIG. 4 is a sectional view showing principal portions of an apparatus according to a second embodiment of the present invention.

An apparatus according to a second embodiment of the present invention is described below with reference to FIG. 4.

Similarly to the first embodiment, a holding member 57 made of iron comprises a plate-shaped portion 57b having a through-hole 57a formed therethrough at the position at which a solenoid valve 29' is disposed; and a cylindrical portion 57c connected with the plate-shaped portion 57b and surrounding the through-hole 57a. Both ends of the cylindrical portion 57c are opened.

It is possible to manufacture the plate-shaped portion 57b and the cylindrical portion 57c separately from each other and connect them with each other by means of welding or integrally form them by plastic working.

The frame 35' of the solenoid valve 29' comprises only a pressure receiving portion 35a' to be accommodated in the mounting opening 31 of the housing 30, namely, only a portion consisting of a liquid flowing path 37' and a discharge path 39'. That is, the apparatus does not include a portion corresponding to the cylindrical portion 35b of the frame 35 of the first embodiment.

A disk-shaped portion 58 projecting from a surface of the housing 30 is disposed on the end surface of the frame 35' on the valve chest side thereof.

In the second embodiment, the disk-shaped portion 58 engages the through-hole 57a of the holding member 57, and the interior of the cylindrical portion 57c forms a hollow portion 42' of the solenoid valve 29'.

The end surface of the cylindrical portion 57c opposite to the housing 30 is closed by a flanged portion 47a' of a stator 47'.

The bolt 55 inserted into the inserting openings 57d formed on the plate-shaped portion 57b of the holding member 57 is screwed into the screw opening 30a of the housing 30. In this manner, the solenoid valve 29' is fixed to the housing 30 by the holding member 57.

According to the second embodiment, upon energizing of the electromagnetic coil 49, there is generated a magnetic circuit constituting a magnetic path in the order of the armature 43, the frame 35', the cylindrical portion 57c of the holding member 57, and the stator 47'.

Since the magnetic circuit in the periphery of the cylindrical electromagnetic coil 49 is composed of the cylindrical portion 57c, it is unnecessary to form a cylindrical portion on the frame 35' unlike the conventional apparatuses as shown in FIGS. 6 and 7 and thus the apparatus of the second embodiment can be manufactured at a low cost.

That is, as described above, it is necessary to machine the frame 35' from a solid material. In the conventional apparatus, a large quantity of material is cut off or thrown away in forming the cylindrical portion 4b. But in the second embodiment, it is only necessary to form the liquid flowing path 37', the discharge path 39', and the valve chest 41 inside the frame 35'. Accordingly, a small amount of material is consumed and cut off. Thus, the apparatus can be manufactured at a low cost.

The other constituent members and operation of the apparatus according to the second embodiment are similar to those of the first embodiment. Therefore, the description thereof is omitted herein.

Figure 5:
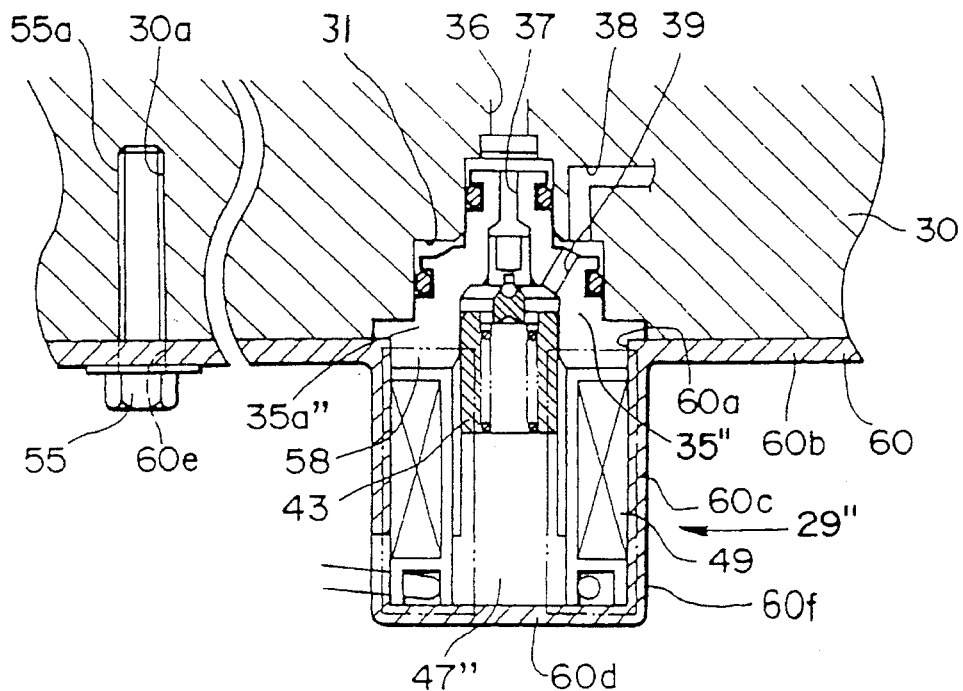
FIG. 5 is a sectional view showing principal portions of an apparatus according to a third embodiment of the present invention.

A third embodiment according to the present invention is described below with reference to FIG. 5. A holding member 60 made of iron comprises a plate-shaped portion 60b having a through-hole 60a formed therethrough in correspondence with a solenoid valve 29"; and a cylindrical portion 60c connected with the plate 60b and surrounding the through-hole 60a.

One end of the cylindrical portion 60c on the through-hole 60a side is opened and the other end 60d opposite to the through-hole side is closed.

A plurality of inserting openings 60e is formed through the plate-shaped portion 60b of the holding member 60, and the bolt 55 inserted into each inserting openings 60e is screwed into the screw opening 30a of the housing 30. In this manner, the solenoid valve 29" is fixed to the housing 30 by the holding member 60.

The cylindrical portion is not formed in the frame 35" of the solenoid valve 29" similarly to the second embodiment.

The stator 47" of the solenoid valve 29" is cylindrical and a flanged portion is not formed thereon, similarly to the first embodiment.

According to the third embodiment, the frame 35" of the solenoid valve 29" is accommodated in the mounting opening 31 of the housing 30, and the projection 58 projecting from the surface of the housing 30 is engaged by the through-hole 60a of the holding member 60. A closed space formed by a periphery 60f of the cylindrical portion 60c and the closed end 60d forms a hollow portion 42 accommodating the stator 47" and the electromagnetic coil 49.

In the third embodiment, upon energizing of the electromagnetic coil 49, there is generated a magnetic circuit constituting a magnetic path in the order of the armature 43, the periphery 60f of the cylindrical portion 60c, the closed end 60d of the cylindrical portion 60c, and the stator 47".

As described above, in the third embodiment, the magnetic path in the periphery of the magnetic circuit of the cylindrical electromagnetic coil 49 and the magnetic path thereof opposite to the pressure receiving portion 35a" are composed of the periphery 60f of the cylindrical portion 60c and the closed end 60d thereof, respectively. This construction provides the following advantages.

Since the flanged portion is not formed on the stator 47", the dimension A of the solenoid valve 29" in its axial direction can be reduced and thus the apparatus can be made to be compact similarly to the first embodiment.

In addition, since the cylindrical portion is not formed on the frame 35", a small amount of material is consumed in processing a material into the frame 35" similarly to the second embodiment. Thus, the apparatus can be manufactured at a low cost.

The other constituent members and operation of the apparatus according to the third embodiment are similar to those of the first and second embodiments. Therefore, the description thereof is omitted herein.

The present invention is not limited to the above described embodiments, but modified in various aspects. For example, a magnetic material may be used as the material of the holding material instead of iron, provided that the material can compose a part of the magnetic path.

The mounting-direction of the solenoid valve on the housing or the piping in the housing may be modified. For example, although the pressurizing side and the pressure reducing side are both composed of the solenoid valve in the embodiments, the pressurizing side may be replaced with a flow control valve.

In addition, the apparatuses according the above described embodiments are used to perform an anti-lock control but may be used to carry out a traction control provided that the apparatus is provided in the circuit for controlling the pressure of braking fluid.

As apparent from the forgoing description, the magnetic path of the electromagnetic coil is conventionally composed by the frame of the solenoid valve, while according to the apparatus of the present invention, the holding portion constitutes the magnetic path of the electromagnetic coil. Therefore, a compact apparatus can be manufactured.

That is, according to one aspect of the present invention, the end portion of the solenoid valve on the stator side thereof is pressed by the holding member composed of a magnetic material to fix the solenoid valve to the housing. According to this construction, of the magnetic circuit generated by the cylindrical electromagnetic coil, the holding member is capable of composing the magnetic path of an end surface opposite to the pressure receiving portion of the solenoid valve. Therefore, it is unnecessary to form the flanged portion on the stator of the solenoid valve unlike the conventional apparatus. The interval between the housing and the holding member, namely, the dimension of the solenoid valve in its axial direction can be reduced by the thickness of the flanged portion. In this manner, a compact apparatus can be manufactured.

According to another aspect of the present invention, the holding member is provided with the cylindrical portion having both ends thereof opened. Accordingly, in the magnetic circuit, the magnetic path in the periphery of the electromagnetic coil can be composed of the cylindrical portion having both ends thereof opened. In this case, unlike the conventional apparatus, it is unnecessary to form the cylindrical portion in the solenoid valve, and to construct only the pressure receiving side inside the frame of the solenoid valve. Consequently, a smaller amount of material is consumed to manufacture the frame. In machining the frame from a material, a large quantity of material is cut off and thrown away in boring the cylindrical portion according to the conventional art whereas according to the above construction of the present invention, it is only necessary to form the fluid flowing path and the discharge path inside the frame. Therefore, a small amount of material is cut off. That is, the frame can be manufactured at a low cost.

In addition, according to a further aspect of the present invention, the holding member is provided with the cylindrical portion having one end thereof opened. In this case, in the magnetic circuit, the magnetic path in the periphery of the electromagnetic coil and that of an end surface opposite to the pressure receiving portion can be composed of the periphery of the cylindrical portion having one end thereof opened and the closed end portion thereof, respectively. Therefore, unlike the conventional apparatus, it is unnecessary to form the flanged portion or the cylindrical portion on the stator. Thus, the thickness of the solenoid valve in its axial direction can be reduced. In this manner, a compact apparatus can be manufactured at a low cost.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An apparatus, for controlling the pressure of braking-fluid, provided in a circuit for controlling the pressure thereof comprising:

a housing including a pressurizing duct and a discharge duct;

a solenoid valve comprising:

a frame with fluid flowing and having a pressure receiving portion fluid tightly inserted into said housing and having a fluid flow path formed in said frame for communicating with said pressurizing duct and a discharge path formed in said frame for communicating with said discharge duct; and an electromagnetic coil for controlling the pressure of the braking-fluid by opening and closing a valve ball communicating with said pressure receiving portion;

holding means abutting said frame, for holding said solenoid valve and said frame on said housing against fluid pressure acting on said pressure receiving portion, said holding means being made of a magnetic material and comprising a part of the electromagnetic path of said solenoid valve, and wherein said frame is sandwiched by said holding means and said housing.

2. The apparatus for controlling the pressure of braking-fluid according to claim 1, wherein said electromagnetic coil includes a peripheral portion, and said holding means comprises a magnetic path in said peripheral portion of said electromagnetic coil.

3. The apparatus for controlling the pressure of braking-fluid according to claim 1, wherein said electromagnetic coil is cylindrical and includes a pressure receiving portion, and said holding means comprises:

an end surface positioned opposite said pressure receiving portion of said electromagnetic coil; and a magnetic path in said end surface.

4. The apparatus for controlling the pressure of braking-fluid according to claim 1, wherein said electromagnetic coil is cylindrical and includes a peripheral portion and a pressure receiving portion, and said holding means comprises:

an end surface positioned opposite said pressure receiving portion of said electromagnetic coil; and a magnetic path in said peripheral portion of said electromagnetic coil and in said end surface.

5. The apparatus for controlling the pressure of braking-fluid according to claim 1, further comprising means for securing said holding means to said housing.

6. The apparatus for controlling the pressure of braking-fluid according to claim 1, wherein said holding means comprises a plate including a plurality of openings.

7. The apparatus for controlling the pressure of braking-fluid according to claim 1, wherein said holding means comprises a plate portion including a through-hole and a cylindrical portion surrounding said through-hole.

8. The apparatus for controlling the pressure of braking-fluid according to claim 1, wherein said holding means comprises a plate portion including a through-hole and a cylindrical portion, surrounding said through-hole, said cylindrical portion having an open end positioned on said through-hole and a closed end opposing said open end.

9. The apparatus for controlling the pressure of braking-fluid according to claim 1, wherein said frame comprises a cylindrical portion including a lower end surface; and said apparatus further comprising a stator comprising a cylinder including an end portion flush with said lower end surface.

* * * * *